United States Patent [19]

Nagase

[11] 4,239,292
[45] Dec. 16, 1980

[54] BRAKE GEAR FOR VEHICLES
[75] Inventor: Minoru Nagase, Kobe, Japan
[73] Assignee: The Nippon Air Brake Co., Ltd, Kobe, Japan
[21] Appl. No.: 21,741
[22] Filed: Mar. 19, 1979
[30] Foreign Application Priority Data
Apr. 7, 1978 [JP] Japan ................................. 53-41482
[51] Int. Cl.³ ............................................. B60T 13/74
[52] U.S. Cl. ........................................ 303/3; 303/15; 303/22 R
[58] Field of Search ............... 303/15, 16, 17, 8, 22 R, 303/22 A, 3, 23

[56] References Cited
U.S. PATENT DOCUMENTS

| 3,944,287 | 3/1976 | Nagase | 303/3 X |
| 4,073,541 | 2/1978 | Nagase | 303/22 R X |

Primary Examiner—Douglas C. Butler
Attorney, Agent, or Firm—G. J. Falce; R. W. McIntire, Jr.

[57] ABSTRACT

A brake control system for a railway transit-type train having a control car, on which an electrical brake command is provided, and one or more controlled cars. The electric brake command is converted to a fluid pressure control signal that is connected to a load-adaptive relay valve device on the control car, as well as on each controlled car. Each load-adaptive relay valve is adjusted according to the load condition of a respective car so that the brake pressure of each car is developed consistent with its particular load and in accordance with the brake command in effect. In one embodiment of the invention, the electric brake command is a digital binary code formed by a three-wire control line and converted on the control car to a fluid pressure brake command signal by conventional electro-pneumatic valves and a multi-diaphragm relay valve device. One alternate embodiment contemplates an electric digital-/analog converter in series with an electric/pressure transducer, while another alternative embodiment deals with converting an analog electric brake command signal to a fluid pressure brake command using an electric/pressure transducer.

5 Claims, 6 Drawing Figures

BRAKE GEAR FOR VEHICLES

BACKGROUND OF THE INVENTION

This invention concerns the brake apparatus for a train made up by the connection of a number of transit-type railway vehicles, and aims at the simplification of the braking apparatus, reduction of the size and weight of the apparatus, improvement of the brake capacity, simplification of the installation, and reduction of cost. In transit-type trains of the past, braking gear has been used, such as shown in the prior art of FIG. 1, for example. That is to say, the electric brake command sent out from the brake controller 1 installed on the driver's stand is fed to the command wires $SB_1$, $SB_2$, and $SB_3$, which are connected to extend throughout all the vehicles, each command wire transmitting a control signal to a respective one of the electro-pneumatic valves 2, 3, and 4 installed on each vehicle. These electro-pneumatic valves 2, 3 and 4 are operated by reception of the on-off binary electric signal from the command wires $SB_1$, $SB_2$ and $SB_3$, in order to control the supply and exhaust of fluid pressure supplied to the respective diaphragm plate chambers $C_1$, $C_2$ and $C_3$ of the double relay valve 5. The output pressure PB reflects these combined pressure signals and is connected to the brake cylinder BC. For example, if the digital binary signals sent to wires $SB_3$, $SB_2$ and $SB_1$ are expressed in terms of binary codes (0 0 1), (0 1 0), (0 1 1), (1 0 0), (1 0 1), (1 1 0), and (1 1 1), and if the proportion of three diaphragm plate areas of relay valve 5 is 7:6:4, output pressures in seven stages, as shown in the table below, are formed and sent to the brake cylinder BC.

| Digital Condition of Command Wires $SB_3$, $SB_2$ and $SB_1$ | Electro-Pneumatic Valves which open | Pressurized Relay Valve Diaphragm Chambers | Weighted Values of Output Pressures |
| --- | --- | --- | --- |
| 0 0 1 | 2 | $C_1$ | 1 |
| 0 1 0 | 3 | $C_2$ | 2 |
| 0 1 1 | 2, 3 | $C_1$, $C_2$ | 3 |
| 1 0 0 | 4 | $C_3$ | 4 |
| 1 0 1 | 2, 4 | $C_1$, $C_3$ | 5 |
| 1 1 0 | 3, 4 | $C_2$, $C_3$ | 6 |
| 1 1 1 | 2, 3, 4 | $C_1$, $C_2$, $C_3$ | 7 |

The compressed air supplied to the previously mentioned electro-pneumatic valves 2, 3 and 4 is adjusted to a pressure corresponding to the load of each vehicle by the load-adaptive pressure regulator valve 6. The load-adaptive regulating valve is connected at its diaphragm chambers 6a and 6b respectively to the air springs $AS_1$ and $AS_2$ in a vehicle. These diaphragm chambers 6a and 6b are compartmentalized by a pair of diaphragms linked with a connecting rod. An exhaust chamber 6c adjoining chamber 6b contains a spring 6e, which acts upwardly on a supply-exhaust valve rod 6f through a diaphragm plate 6d installed in the exhaust chamber 6c. A supply-exhaust valve 6g is normally engaged with a supply seat and disengaged from an exhaust seat formed at the end of rod 6f. Compressed air supplied via input 6h is delivered to output 6i via the supply-exhaust valve 6g proportional to the mean of the two pressures of the air springs $AS_1$ and $AS_2$. Accordingly, the braking pressure corresponding to the command from the brake controller 1, as well as the load of each vehicle, is developed independently and supplied to the brake cylinder of each vehicle. According to the above brake apparatus, each vehicle is equipped with a control unit consisting of the electro-pneumatic valves 2, 3 and 4, the multi-diaphragm relay valve 5, and the load-adaptive regulating valve 6, all being conventional. However, for the sake of simplification and weight reduction, a method has been devised, in which the control unit and the load-adaptive regulating valve are installed only in one vehicle, but not in the other vehicles. For example, it is uneconomical and not conducive to weight reduction and simplification to attach the same brake apparatus to relatively small size vehicles such as vehicles for monorails or for the new light rail vehicles in the same way as for suburban trains or subway trains. In order to meet this need, a method is being used in which by installing the controlling unit and the load-adaptive regulating valve 6' in one car (Car A) and only the relay valve 7 in the other cars (for example, Car B), the braking pressure is sent to the brake cylinder of the other car (Car B) from the output pressure of the control unit of one car (Car A). The relay valve 7 is a commonly known self-lapping type. Weight reduction and cost reduction are achieved by this method in small vehicles, since only one set of the control unit and the load-adaptive regulating valve is used. However, with this arrangement, it is necessary to install a large number of pipes, which are connected between cars to transmit the air spring pressure of each vehicle to the load-adaptive regulating valve 6' of Car A, making the fitting of the components complex. Besides, since the single load-adaptive regulating valve transmits to the control unit the mean pressure of the air-spring pressure of all the vehicles, a braking force best suited to the load condition of each vehicle cannot be obtained when the load weight differs for each vehicle. This causes severe interaction between the vehicles. In light vehicles, an unnecessarily large braking force results in wheel slippage, while the brake effect is inadequate on loaded vehicles.

SUMMARY OF THE INVENTION

The object of the present invention, therefore, is to provide a transit-type train brake system, which overcomes the necessity of duplicate components on each vehicle without the disadvantages mentioned above.

This objective is accomplished in one embodiment by providing a load-adaptive relay valve device on each car of the train that responds to the output from the multi-diaphragm relay associated with the brake control unit on a single car of the train. On all cars other than the car having the brake command components, this load-adaptive relay represents the only brake control component required in producing the brake cylinder pressure commanded, with load adjustment being accomplished in accordance with the individual vehicle load condition. Accordingly, the overall installation is reduced in size and weight, wheel slip and harsh train action due to interaction between respective cars of the train are avoided, and more efficient braking is produced.

Other embodiments convert either analog or digital electric signals to an analog pressure signal for controlling the load-adaptive relay valve device.

BRIEF DESCRIPTION OF THE DRAWINGS

Other objects and advantageous features of the invention will become apparent from the following more detailed description when taken with the accompanying drawings in which:

FIG. 3 shows a preferred embodiment of the invention; and

DESCRIPTION AND OPERATION

As shown in FIG. 3, the arrangement is such that the control unit and a load-adaptive relay valve 8 are installed only on a single car (Car A) and only a load-adaptive valve 8' is installed on the other vehicle(s) (Car B).

Figure 1:
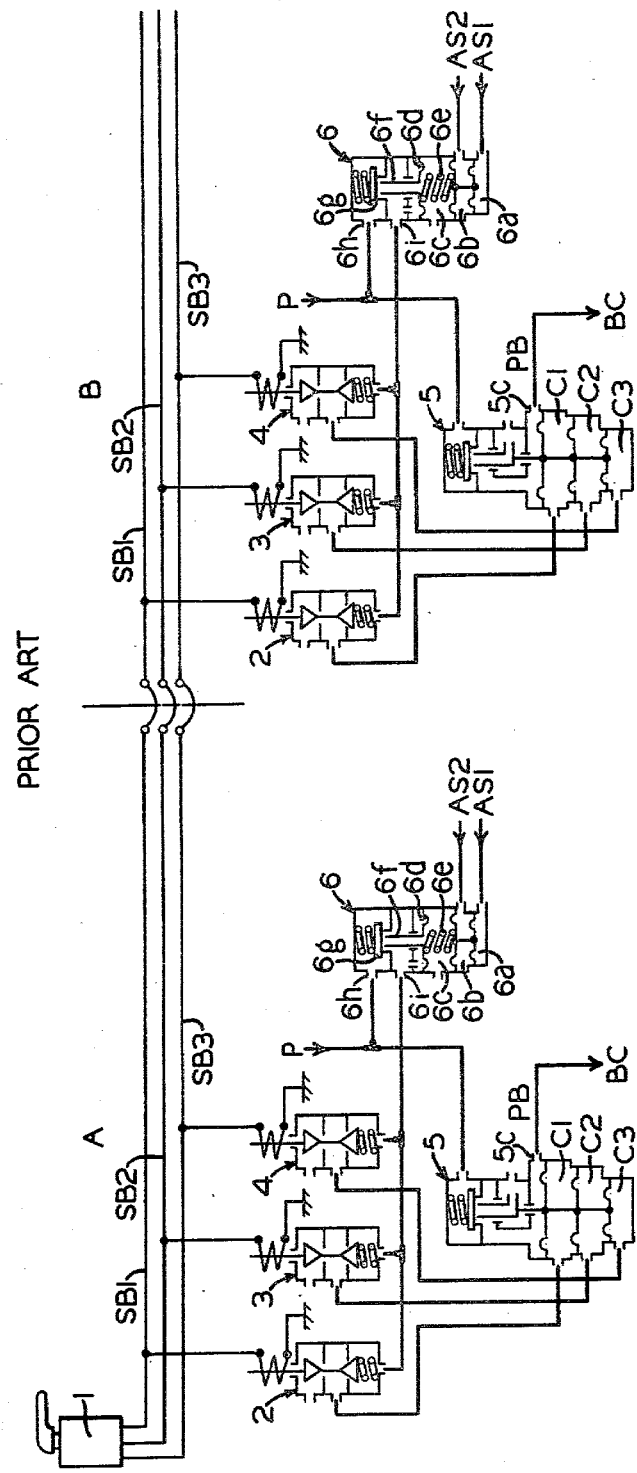
FIGS. 1 and 2 show prior art arrangements.
Figure 2:
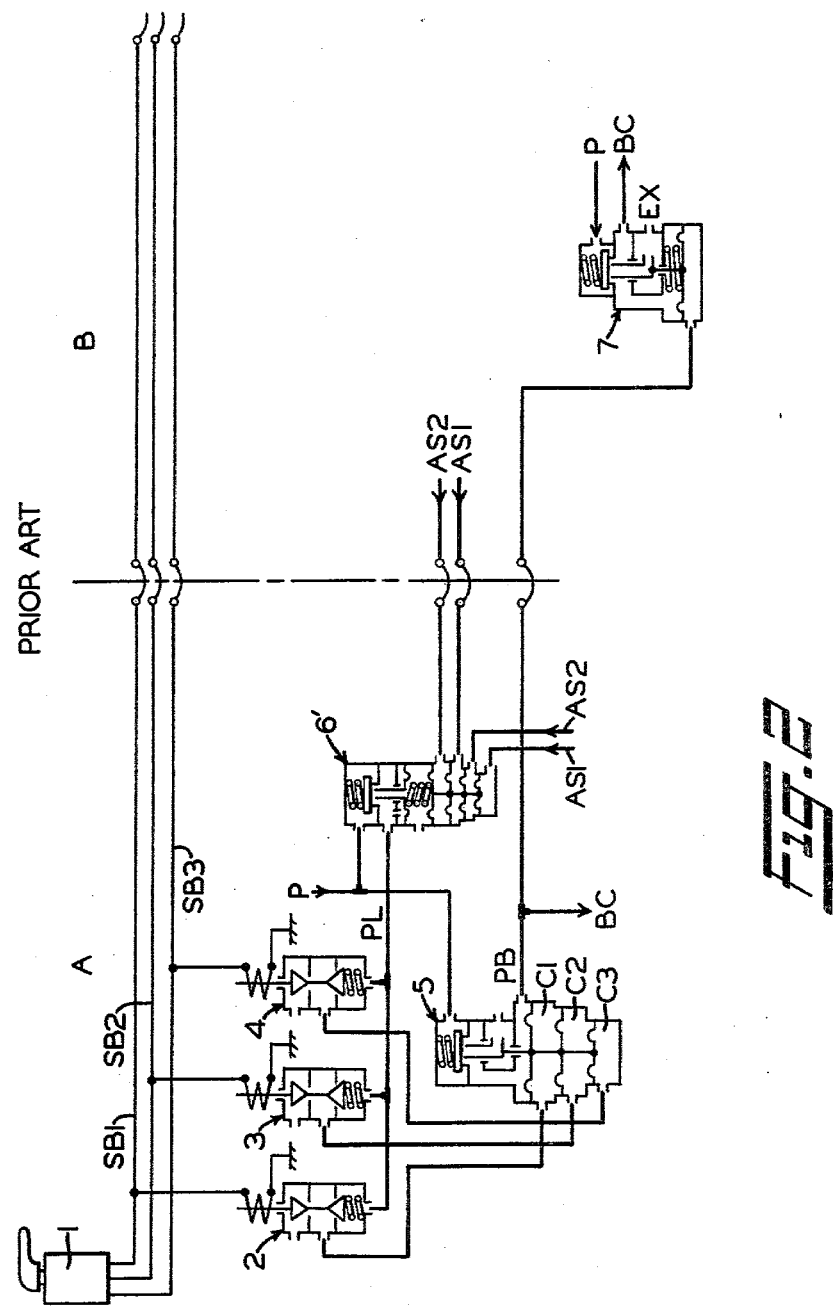
Figure 2:
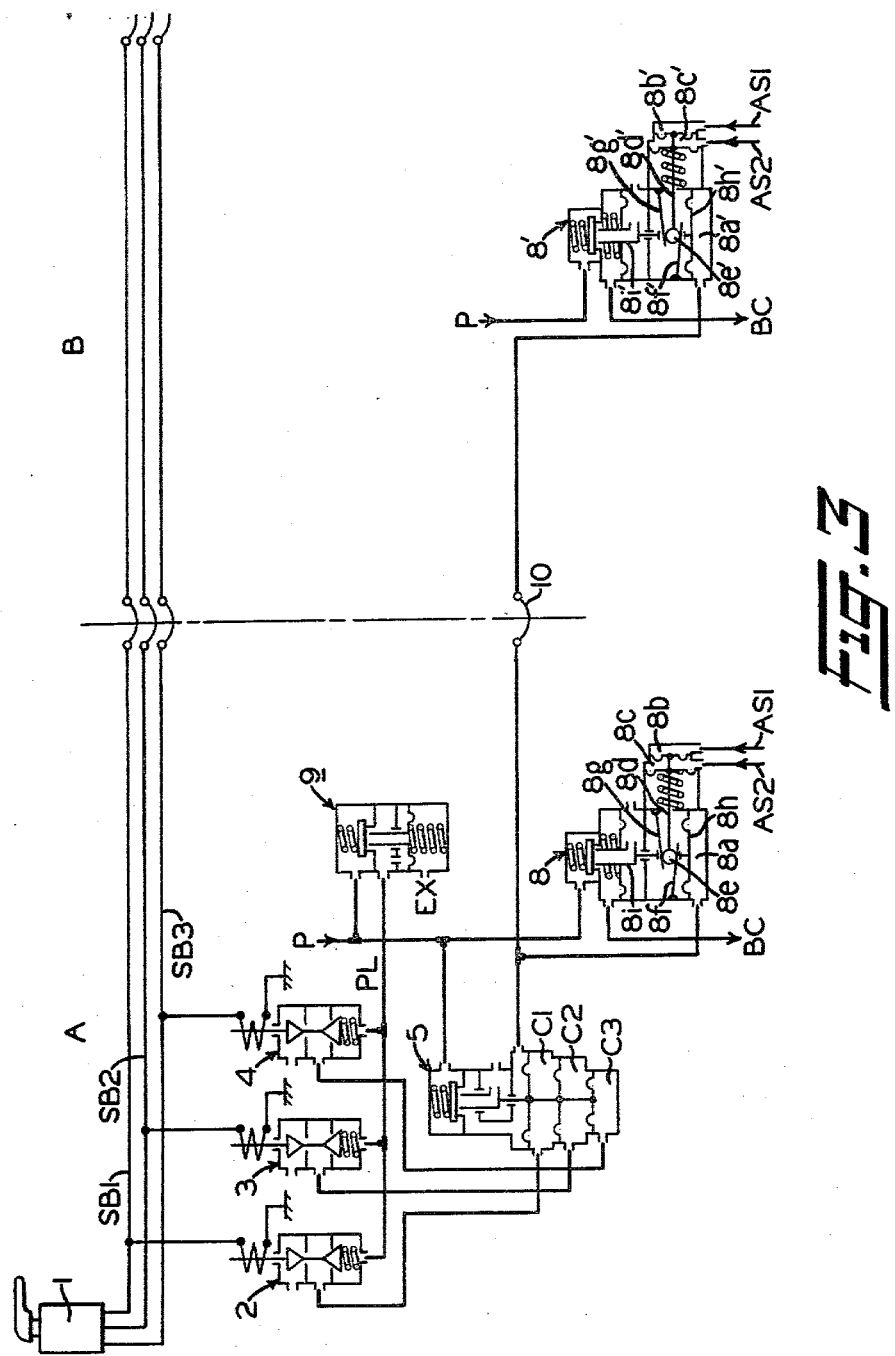
Figure 4:
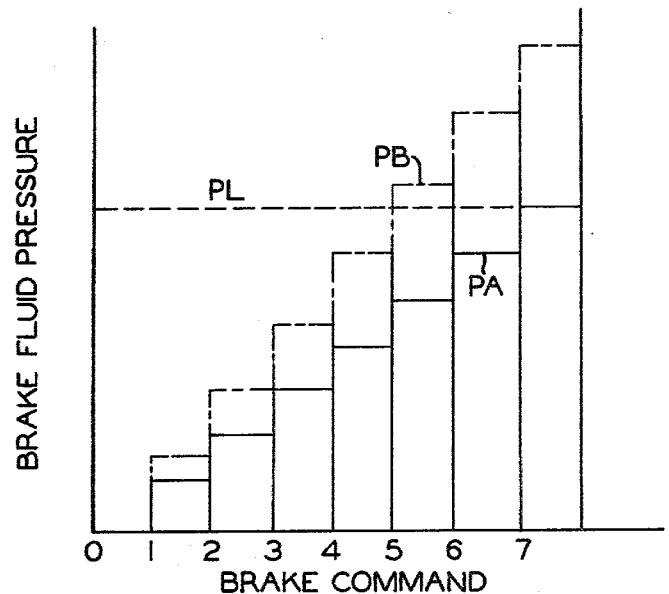
FIG. 4 is a graph showing the effect of the load-adaptive valve in the preferred embodiment.

The brake controller 1, the brake command wires $SB_1$, $SB_2$, and $SB_3$, the electro-pneumatic valves 2, 3, and 4, and the multi-diaphragm relay valve 5 have the same structures as shown in the prior art of FIG. 1. The arrangement of FIG. 3 differs, however, in that the output from the multi-diaphragm relay valve 5 on Car A is supplied to the diaphragm chamber 8a of load-adaptive relay valve 8 and also supplied to the diaphragm chamber 8a' of load-adaptive relay valve 8' on Car B, thus allowing for the elimination of the multi-diaphragm relay valve on Car B, as well as on other trailing cars. In addition, a conventional pressure regulating valve 9 is installed on Car A by which the air pressure PL is supplied to each electromagnetic valve of the vehicle A from a source of pressure P and is adjusted to the maximum braking pressure of the empty vehicle. Although the load-adaptive relay valve 8 has a structure different from that in FIG. 1, its action is identical and its structure conventional, being fully explained in U.S. Pat. No. 4,073,541. That is to say, the compressed air from the air springs inlet lines $AS_1$ and $AS_2$ is supplied to the diaphragm chambers 8b and 8c, and the mean pressure of the two air spring pressures moves the diaphragm piston 8d. By this means, the movements of the diaphragm plate 8h and the supply-and-exhaust valve rod 8i are adjusted through the fulcrum roller 8e, the levers 8f and 8g, whereby the output to the brake cylinder is varied according to the load of the vehicle. FIG. 4 is a graph showing the range of the brake pressure adjusted by this load-adaptive relay valve 8. In this graph, the brake command is plotted on the abscissa and the brake fluid pressure on the ordinate, line PL is the output of the regulating valve 9 and the maximum brake pressure of the empty vehicle. In the graph, the solid line PA is the brake fluid pressure at each step of the brake command when the vehicle is empty, and the broken line PB is the brake fluid pressure at each step of the brake command when the vehicle is fully loaded. The brake fluid pressure at output BC of load-adaptive relay valve 8, 8' is adjusted within the ranges of the two lines PA and PB according to the respective vehicle air spring pressure at inputs $AS_1$ and $AS_2$ to obtain a braking force most suited to the load operates on each vehicle. When the command from the brake controller 1 is not in the form of digital-mode signals but continuous analog-mode signals, the graph of FIG. 4 takes a form of a continuous line, as opposed to the step form shown.

Figures 5, 6:
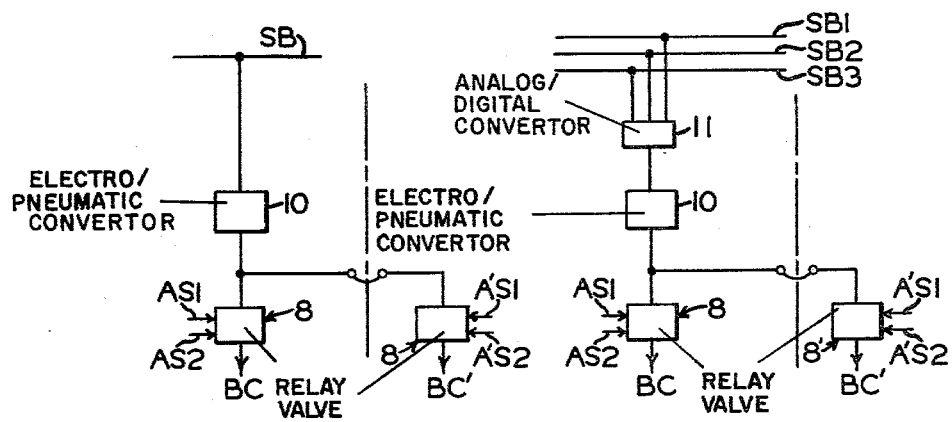
FIGS. 5 and 6 show alternate embodiments of the invention.

As other alternative embodiments of this invention, the following arrangements are also possible. As in FIG. 5, in place of several electromagnetic valves and the double relay valve, the electric command of the analog-type can be fed to the electric/pneumatic converter valve 10 from the analog command wire SB, and the variable air pressure from the electric pneumatic converter valve 10 can be supplied to the load-adaptive relay valves 8 and 8' of respective vehicles; or the electric command of a digital mode from the brake command wires $SB_1$, $SB_2$ and $SB_3$ can be converted into the electric command of the analog type, by means of an electronic digital/analog converter 11. The electric analog signal is subsequently converted to a variable air pressure by means of an electric/pneumatic converter valve 10, and supplying it to the load-adaptive relay valves 8 and 8', etc., as in FIG. 6. A source of pressure, such as pressure P in FIG. 3, may be regulated and supplied to the electric/pneumatic converter 10 in FIGS. 5 and 6 by means of a pressure regulator 9 similar to the arrangement of FIG. 3.

In the above explanation, the load-adaptive relay valve was explained in terms of utilizing the air spring pressure of the vehicle. The application of this invention to vehicles utilizing the deflection of mechanical-type metal springs as an alternative to air springs is also possible. In this case, the aforementioned air spring pressure is substituted with an air pressure signal produced by an air pressure converter which generates the air pressure in inverse proportion to the distance between the vehicle truck containing the metal springs and the car body supported by the metal springs.

Having now described the invention, what I claim as new and desire to secure by Letters Patent, is:

1. For use in a railway train, a brake control system for providing load-adaptive braking on each car of the train in accordance with the respective load condition of each car and an electric brake command signal effective at a single one of the cars comprising:
   (a) a fluid pressure operable brake cylinder device on each said car;
   (b) means associated with said single one of the cars for converting the electric brake command signal thereat to a corresponding fluid pressure brake command signal;
   (c) a source of fluid pressure;
   (d) a fluid pressure regulator device having an input connected to said source of fluid pressure and an output connected to said converting means for supplying thereto a predetermined level of fluid pressure, whereby said fluid pressure brake command signal is limited to a maximum value corresponding to said predetermined level of supply fluid pressure; and
   (e) means associated with each car for pressurizing said brake cylinder device thereof in accordance with said fluid pressure brake command signal and the respective car load condition to provide said load-adaptive braking on each car.

2. A brake control system as recited in claim 1, wherein:
   (a) said electric brake command is in the form of a digital binary code signal; and
   (b) said means for converting said electric brake command signal to a fluid pressure brake command signal comprises:
      (i) a plurality of electro-pneumatic valves subject to said digital binary code signal, each said electro-pneumatic valve having an output and producing a signal at said output by the presence or absence of fluid pressure thereat in accordance with the digital condition of said binary signal at the respective electro-pneumatic valve; and
      (ii) a first relay valve device having a multi-diaphragm piston assembly subject to said signals at the outputs of said electro-pneumatic valves, an input connected to said source of fluid pressure and an output providing said fluid pressure brake command in accordance with the force exerted by said multi-diaphragm piston assembly.

3. A brake control system as recited in claim 2, wherein said brake cylinder pressurizing means comprises a second relay valve device having a first input connected to said pressure source, a second input connected to the output of said first relay valve device, a third input subject to a pressure representative of the respective car load condition, and an output connected to said brake cylinder device thereof to provide said load-adaptive brake pressure.

4. A brake control system as recited in claim 3, wherein said second relay valve comprises means operative responsive to said load condition pressure at said third input thereof for amplifying said brake command signal as the car load condition increases.

5. A brake control system as recited in claim 1 or 4, wherein said maximum value of said fluid pressure brake command signal represents a predetermined maximum brake level for an empty car.

* * * * *